(12) United States Patent
Mittag (10) Patent No.: US 10,906,697 B2
(45) Date of Patent: Feb. 2, 2021

(54) SYSTEMS AND METHODS FOR ATTACHING A CONTAINER

(71) Applicant: Franklin Steve Mittag, Crosby, TX (US)

(72) Inventor: Franklin Steve Mittag, Crosby, TX (US)

( * ) Notice: Subject to any disclaimer, the term of this patent is extended or adjusted under 35 U.S.C. 154(b) by 72 days.

(21) Appl. No.: 15/482,728

(22) Filed: Apr. 8, 2017

(65) Prior Publication Data

US 2017/0305602 A1 Oct. 26, 2017

Related U.S. Application Data

(60) Provisional application No. 62/326,810, filed on Apr. 24, 2016.

(51) Int. Cl.

| B65D 25/22 | (2006.01) |
|---|---|
| F16B 2/06 | (2006.01) |
| F16M 13/02 | (2006.01) |
| F16B 2/22 | (2006.01) |
| F16B 2/04 | (2006.01) |
| E06C 7/48 | (2006.01) |
| E06C 7/14 | (2006.01) |

(52) U.S. Cl.
CPC ............ *B65D 25/22* (2013.01); *E06C 7/14* (2013.01); *E06C 7/143* (2013.01); *E06C 7/48* (2013.01); *F16B 2/04* (2013.01); *F16B 2/065* (2013.01); *F16B 2/22* (2013.01); *F16M 13/022* (2013.01)

(58) Field of Classification Search
CPC . B65D 25/22; E06C 7/14; E06C 7/143; E06C 7/48; F16B 2/04; F16B 2/065; F16B 2/22; F16M 13/022
See application file for complete search history.

(56) References Cited

U.S. PATENT DOCUMENTS

| 898,755 | A | * | 9/1908 | Little | B60N 3/102 |
| | | | | | 248/311.2 |
| 2,895,700 | A | * | 7/1959 | Johnson | E06C 7/14 |
| | | | | | 248/210 |
| 2,926,879 | A | * | 3/1960 | Dietrich | A47J 45/00 |
| | | | | | 248/311.2 |
| 3,104,859 | A | * | 9/1963 | Hoelzel | E06C 7/14 |
| | | | | | 248/210 |
| 3,233,858 | A | * | 2/1966 | Benjamin | B60N 3/102 |
| | | | | | 248/311.2 |
| D236,175 | S | * | 8/1975 | Wintz | D6/535 |
| 4,013,251 | A | * | 3/1977 | Cleveland | E06C 7/14 |
| | | | | | 248/210 |

(Continued)

*Primary Examiner* — Daniel P Cahn
*Assistant Examiner* — Candace L Bradford
(74) *Attorney, Agent, or Firm* — Cantor Colburn LLP (57) ABSTRACT

A container system securable to a base such as a roof gutter, a railing, a ladder top, a ladder rung, an edge, a platform and the like. The container system includes a container such as a utility bucket, a pail, and the like; a horizontal member in the form of a collar securely attached to or integratedly molded into the container. The collar is provided with a plurality of fasteners to removably attach the container to the base. In one embodiment, the fasteners are selected from braces, clamps, locking devices, clips, hooks, protrusions, and combinations thereof. In one embodiment, a U-bolt is provided to securely attach a bracket to the container, and for attaching to a base.

12 Claims, 5 Drawing Sheets

(56) References Cited

U.S. PATENT DOCUMENTS

| | | | | |
|---|---|---|---|---|
| 4,433,822 A * | 2/1984 | Caggiano | | E06C 7/14 |
| | | | | 248/210 |
| 4,535,923 A * | 8/1985 | Manke | | B60N 3/103 |
| | | | | 224/272 |
| 4,662,594 A * | 5/1987 | Dubis | | E06C 7/143 |
| | | | | 248/231.21 |
| 4,824,060 A * | 4/1989 | Korda | | E06C 7/143 |
| | | | | 182/129 |
| 4,913,394 A * | 4/1990 | Schmid | | E06C 7/143 |
| | | | | 182/122 |
| 5,014,956 A * | 5/1991 | Kayali | | B60N 3/102 |
| | | | | 248/311.2 |
| 5,511,753 A * | 4/1996 | Lage | | B44D 3/14 |
| | | | | 220/737 |
| D373,935 S * | 9/1996 | Cole | | D7/620 |
| 5,729,865 A | 3/1998 | Stoddart | | |
| 5,960,905 A * | 10/1999 | Gardner | | E06C 7/143 |
| | | | | 182/129 |
| D418,612 S * | 1/2000 | Deutsch | | D25/68 |
| 6,213,672 B1 | 4/2001 | Varga | | |
| 7,967,264 B1 * | 6/2011 | Peterson | | E06C 7/143 |
| | | | | 248/210 |
| D715,458 S * | 10/2014 | Collins | | D25/68 |
| 9,045,940 B2 * | 6/2015 | Walters | | E06C 7/143 |
| D788,328 S * | 5/2017 | Mittag | | D25/68 |
| 9,657,890 B2 * | 5/2017 | Botello | | A47B 96/067 |
| 2003/0135955 A1 | 7/2003 | Dove | | |
| 2003/0196854 A1 * | 10/2003 | Beczak, Sr. | | E06C 7/143 |
| | | | | 182/129 |
| 2006/0196999 A1 * | 9/2006 | Owens | | E06C 7/143 |
| | | | | 248/210 |
| 2007/0181367 A1 | 8/2007 | Astor | | |
| 2007/0228237 A1 * | 10/2007 | Pochurek | | E06C 7/143 |
| | | | | 248/210 |
| 2011/0109129 A1 * | 5/2011 | Brill | | B60N 3/004 |
| | | | | 297/188.04 |
| 2015/0047927 A1 | 2/2015 | Nodarse | | |
| 2016/0186925 A1 * | 6/2016 | Bettin | | A63B 1/00 |
| | | | | 248/542 |
| 2017/0114952 A1 * | 4/2017 | Green | | A47G 7/044 |

* cited by examiner

SYSTEMS AND METHODS FOR ATTACHING A CONTAINER

CROSS-REFERENCE TO RELATED APPLICATIONS

This application claims benefit under 35 USC 119 of US Provisional Patent Application No. 62/326,810 having a filing date of Apr. 24, 2016. This application claims priority to and benefits from the foregoing, the disclosures of which are incorporated herein by reference.

TECHNICAL FIELD

The disclosure relates to a container system, a container, and supports/attachments that can be used with the container to secure the container to a ladder, a gutter, a railing, a gutter, etc.

BACKGROUND

When working from an elevation, such as a ladder, a hydraulic lift, a roof cleaning a gutter, it is convenient for the worker to have tools, paint, and other required items readily accessible in a location where they can be conveniently stored and retrieved, allowing the worker free use of both hands. Additionally, the worker may want to have ready access to a container to store debris. A homeowner may want to have a planter container that can be detachably secured to a window sill during the planting season for flowers, etc., and removed from the window when not needed in off-season.

There is a need for a container that is versatile for utility purpose, and support/attachment system that can be used with the versatile utility container.

SUMMARY OF THE INVENTION

In one aspect, the disclosure relates to a container system for attaching to a base. The container system comprises: a container comprising a bottom wall and a sidewall having a top and a bottom, the bottom wall is connected to the bottom of the sidewall defining a cavity, the container having a channel located outside of the container and close to the top of the sidewall; a U-bolt having a bend radius and two open ends, the U-bolt being sized for the bend radius to be positioned in the channel of the container; a first bracket having two open holes for the two open ends of the U-bolt to go through; a plurality of fasteners to secure the open ends of the U-bolt and tightly clamp the U-bolt when the bend radius of the U-bolt is positioned in the channel of the container with the two threaded ends of the U-bolt inserted through the two open holes, for the container to be securely attached to the bracket by clamping the U-bolt with the plurality of first fasteners; wherein the bracket is adapted with second fasteners to attach the container system to a base or to a second bracket.

In a second aspect, the disclosure relates to a container system with integrated parts. The system comprises a bottom wall having a longest dimension and a shortest dimension, and a sidewall having a top and a bottom, the bottom wall is connected to the bottom of the sidewall defining a cavity; a flared portion connected to at least 40% of the top of the sidewall, the flared portion having a thickness of at least at least ½" thick, and a straight member with a length at least equal to the shortest dimension; wherein the straight member is adapted with a plurality of fasteners to attach the container system to a base or a bracket.

In another aspect, the disclosure relates to a combination of a ladder and a suspendible container system for holding items therein. The container system is connected to the ladder. The ladder includes a top surface with at least two open holes. The container system comprises: a container comprising a plurality of sidewalls and a bottom wall, the sidewalls and bottom wall connected to one another to define a cavity; a horizontal member connected to the container. The horizontal member is adapted with a plurality of protrusions that are sized to correspondingly fit into the open slots when the protrusions are disposed in the open slots to attach the container system to the top surface of the container to removably secure the suspendible container system to the ladder.

In yet another aspect, the disclosure relates to a container system, comprising: a container comprising a bottom wall and a sidewall having a top and a bottom, the bottom wall is connected to the bottom of the sidewall defining a cavity, the top having a longest dimension and a shortest dimension; a collar extending around and surrounding at least a portion of the sidewall, the collar having at least two open ends; a straight member attached to the at least two open ends of the collar, the straight member having a length at least equal to the shortest dimension; and wherein the straight member is adapted with a plurality of first fasteners to attach the container system to a base or a bracket.

In one embodiment, the container further comprises a channel located outside at least a portion of the container and close to the top of the sidewall; a U-bolt with two open ends connected to a bend portion for extending around at least a portion of the sidewall of the container, the U-bolt being sized for the bend portion to be positioned in the channel; the collar comprises two open holes for the two open ends of the U-bolt to go through; the straight member is a first bracket having a set of open holes; and a plurality of second fasteners to secure the open ends and clamp the U-bolt to the first bracket when the bend portion of the U-bolt is positioned in the channel of the container with the two open ends of the U-bolt inserted through the set of open holes in the first bracket.

DETAILED DESCRIPTION

The present disclosure relates to a versatile container system with a container and supports/attachments that can be used with the container to secure the container to a ladder, a gutter, a railing, etc. The terms container, pail, and bucket may be used interchangeably.

The term "container" refers to any of a pail or a bucket, for utilities such as mixing paint, storing parts and other utility purposes, and available in a number of sizes, e.g., 7 gallon, 5 gallon, 4 gallon, 1 gallon, etc., of various shapes such as square or circular. In some embodiments, the container has a channel located near or at the top sidewall to engage a U bolt. In some embodiments, the channel is located in-between ridges formed at the top of the container, e.g., within three (3) inches of the top of the container. In other embodiments, the channel is formed as a groove just below the top of the container, e.g., for engaging a top cap or cover of the container. In some embodiments, the container is provided with a plurality of clips or fasteners at and around the top of the container to fasten or engage a U bolt.

The term "U bolt" herein refers to an open-end bolt, pipe, tube, tubing, cable, or clamp with a bend radius of any of concave, U shape, semi-circular, circular, and square shape. In some embodiments, the U bolt is engaged in-between and corresponding to a channel located near or at the top portion of the sidewall of the container. The U-bolt can be constructed from materials including metals, metal alloys, synthetic materials, composite materials (e.g., carbon composite), plastics, and the like. In some embodiments, the U-bolt is in the form of a clamp. In other embodiments, the U-bolt is in the form of a ring clamp. In other embodiments, the U-bolt is in the form of a flexible or rigid cable, e.g., a metallic wire rope. In use, the U-bolt applies axial force onto the container while retaining the engagement of the channel (e.g., between ridges or grooves) or clips, to attach the container to a brace or a bracket with nuts, clamps, knots (for U-bolt in a form of a cable), clips, or other fastening means.

The container can be commercially available from hardware stores or building supply stores as an empty container for storage. The container can also be a commercially available bucket sold with paint, cement, compound mix, etc., within. The container in some embodiments is molded from a thermoplastic material, e.g., ABS (acrylonitrile butadiene styrene) resin, or other similar materials. The container can be also made from materials including metals, metal alloys, synthetic materials, composite materials (e.g., carbon composite), and the like.

In some embodiment, the container system comprises a container, a U-bolt, a straight and horizontal member, e.g., a bracket, working in conjunction with the U-bolt to securely attach the container to a base. In some embodiments, the bracket is integrated or molded into the bucket as a single piece. In other embodiments, for example with the use of a rigid material for an integrated bucket and bracket, the U-bolt is eliminated, as the bucket is molded into the bracket as once piece. In yet other embodiments, fasteners such as clips, hooks, hangers, protrusion hooks, etc., can also be molded into the container system as one unit to attach the container system to a base.

The term "base" refers to any of a railing (e.g., side railing of a hydraulic lift, a railing in a utility van or truck, a railing in a garage or a utility shed), a gutter, an edge (e.g., a window sill or a flat surface), a ladder platform, a step, a ladder rung, a side of a ladder, or a flat surface such as a top (cap) of a ladder or other utility platforms.

In some embodiments, the container system is provided with a plurality of brackets. A first bracket is for attaching the container(s) with the U-bolt(s). A second bracket is attached to the first bracket to fasten the first bracket (and/or container) to a base, e.g., a railing in a utility shed, or a ladder. In one embodiment, the first bracket is securely fastened to the container via a U-bolt. The second bracket can be quickly fastened to (or removed from) the first bracket, or vice versa, via fastening means known in the art, e.g., any of a clip, a clamp, a hook.

The second bracket can be of various lengths, e.g., a single-container length for attaching a single container with a first bracket to a ladder, or of a multiple-container length to accommodate a plurality of containers (and corresponding first brackets) to a railing and the like. There can be a plurality of "second" brackets, with the second brackets being interchangeable/can be swapped in and out, e.g., allowing a worker to secure the container (as attached to the first bracket via U-bolt or clamp) to an industrial ladder for one job, a roof gutter for a project, a hydraulic lift for another job, a household ladder for yet another project, then a railing in a garage, a tool shed, or in a van or truck on the drive home.

Either the first or the second bracket can be in any form of a solid tube, a hollow tube, a strip, or a blade, with a length of at least as long as the diameter for a container with a circular top, or the longest dimension of the top for a container with a square or rectangular top.

In some embodiments, the bracket is sufficiently long to extend along the length (or part of the length) of a railing, e.g., a railing in a utility van or truck, for attaching a plurality of containers. The bracket can be constructed from materials including metals, metal alloys, synthetic materials, composite materials (e.g., carbon composite), plastics, and the like.

In one embodiment, the bracket is in the form of a telescoping tube, extendible to accommodate the various sizes (e.g., widths, etc.) of a base, e.g., a ladder top, a ladder rung, a gutter length, etc. The telescoping tube has an inner tube dimensioned and configured to fit within an outer tube, which is equipped with a guide slot or holes for receiving a snap button, with built-in spring mechanism to prevent rotation of the inner tube relative to the outer tube. Examples of telescoping tubes and construction of telescoping tubes are disclosed in U.S. Pat. Nos. 5,729,865 and 6,213,672, and US Publication No. US2003/0135955, incorporated herein by reference.

In some embodiments, the bracket is provided with at least two holes through which the open ends (legs) of the U-bolt extend in conjunction with corresponding nuts (or clips) to securely fasten the container to the bracket. In some embodiments, the bracket is provided with a plurality of holes positioned at different lengths apart to accommodate a plurality of containers to be fastened or secured onto a railing, or to accommodate containers of different sizes and shapes (e.g., 2 gallon square buckets, 5 gallon round pails, etc.).

In some embodiments, the bracket is provided with at least a brace or attachment bar to hook over a base. In some embodiments, the attachment bar is curved at one end, e.g., allowing the bracket to be securely hooked over a railing or a top cap of a ladder. In some embodiments, the attachment bar is slidably adjustable in length for the bracket to be securely attached to bases of different sizes. A locking means, such as a locking bolt, nuts, or clamp, is provided to each of the adjustable-length attachment bar to fix the bar at a desired length.

In some embodiments, the bracket is provided with a plurality of fasteners for attaching, hooking, or clamping onto a base, or onto a second bracket which in turn is attached to, hooked onto, or clamped onto a base. In some embodiments, the fasteners are removable and interchangeable, i.e., to be swapped in and out depending on the type of containers/railings and to be clipped onto the bracket only when needed.

The fasteners can be of different sizes and designs including but not limited to clamps, clips, hooks, latches, clasps, protrusions, catches, extended blades, etc., to accommodate different types/shapes of the base or the second bracket. In some other embodiments, the bracket is provided with fasteners in the form of spring pressure clips or clasps to hold or attach tools.

In one embodiment for attaching to a ladder rung of an extension ladder with rung cavities along the side rails of the ladder, the fasteners are in the form of locking devices, e.g., clamps with insertion pins for engaging the bracket into the rung cavities. Each locking device further contains clamping mechanism to secure the insertion pin within the rung cavity and engage the insertion pin with one end of the bracket. With the clamping mechanism engaged, the bracket having the container attached hereto can be securely attached to the extension ladder via the two rung cavities of one of the ladder rungs. The locking devices are removable, allowing an operator to move and secure the container up and down the extension ladder via the ladder rungs and corresponding cavities along the side rails.

In one embodiment, the clamping mechanism comprises spring loaded insertion pins to engage the rung cavities with the bracket. In order to secure the container to an extension ladder, two fasteners or locking clamps are provided with a dual set of spring loaded insertion pins, one for the left and one for the right side cavity of the ladder rung. Each spring loaded mechanism comprises a flange for compressing a spring between the flange and an end cap. The flange is connected to a shaft that is connected to the insertion pin. In one embodiment, the insertion pin is for inserting into a hole in the bracket, sized to fit the insertion pin, with the flange and the end cap is being sized for fitting into the cavity of the ladder rung. In another embodiment, instead of having an insertion pin, a second spring loaded mechanism is provided to accommodate (hollow) brackets of different sizes, with the hole at the end of the bracket being sized to mate with the flange/end cap of the spring loaded mechanism.

In yet another embodiment, the locking device is in the form of a clamping jaw to firmly engage with the ladder rung via the cavities such that the bracket having a container attached hereto is firmly secured to the extension ladder. Alternatively, the locking devices may comprise U-shaped braces, one for each end of the bracket to simultaneously engage the bracket with the rung cavities. Illustrative embodiments of fasteners in the form of locking devices are disclosed in US Publication No. US 2015/0047927, incorporated herein by reference.

In some embodiment, the bracket is provided with protrusions in the form of elongated or projecting tongues that matingly wedge into holes, slots, or slits provided in certain bases, e.g., a railing, a ladder top, or another bracket. In other embodiments, the bracket is provided with fasteners in the form of protrusions that matingly wedge into slots or holes provided in base such as ladder tops. An example is a ladder top having a plurality of side slots located off the back surface of the ladder top as disclosed in US Patent Publication No. 2007/0181367A1, incorporated herein by reference. In one example, the slots of the ladder have a circular region that extends down from a top opening, and each slot is wider at the top than the bottom. The slots are designed as "tool lasso" slots, for attaching bungees or accepting accessories that may fit into the slots, e.g., screw drivers and the like. The protrusions are spaced apart at a distance corresponding to the distance between the side slots of the ladder. Each (male) protrusion is shaped to fit into the (female) geometry of the side slot. Each protrusion has a tapered shape, larger and the top and smaller near the bottom, allowing the protrusion to firmly wedge into the slot. Each protrusion is optionally provided with a side blade to guide/allow the protrusion to slide into the slot.

In some embodiments, the fasteners are in the form of clamps with grip portions and clamp portions to secure the bracket to a railing, a gutter edge, or onto another bracket. In other embodiments, the fasteners are in the form of spring pressure clips, with each clip having two legs connected by means of a center base and formed such that when the legs are pressed (squeezed) together, they converge. The clips can be used to attach the bracket to a railing or another bracket with openings for receiving the spring pressure clips. Each opening is of sufficient size (at least equivalent to the center base of the clip) for inserting the two legs of the spring pressure clips through the opening, when the legs are pressed or squeezed together. After insertion, the two legs diverge, pressing against the opening, keeping the bracket steady in place.

In other embodiments, the bracket is provided with fasteners each in the form of an L-shaped (or V-shaped) tongue, allowing the bracket to be coupled with a base or another bracket having a corresponding slot for receiving the L-shaped tongue. In operation, the weight of the bucket pulls down on the bracket, preventing longitudinal motion on the connected parts and keeping the tongue securely in the slot.

In some other embodiments, the bracket is provided with fasteners in the form of L-shaped supporting hooks. Each supporting hook has a downwardly engaging portion which is adapted to engage in a slot formed in a second bracket or a mounted rack of a base. In one embodiment, the engaging portion is tapered so that the L-shaped supporting hook can be wedged in the slot. The slots in one embodiment are metal bands protruded from the rack or from a second bracket. In another embodiment, the slots are narrow vertical openings in the rack or in the second bracket. After insertion into an opening, each supporting hook is pressed downwardly until the tapered notch rides down over the lower edge of the opening, allowing the supporting hook to tightly hold the connected bracket in place and minimizing the separation or slipping of the bracket (with the L-shaped supporting hooks) from the base or a second bracket (with the vertical openings).

Applications and Operations: In some embodiments, the container system comprises a bucket (pail), a bracket, and fastener(s), all molded or integrated into a single piece. In some other embodiments, the container system comprises a bucket, a U-bolt, a bracket, a plurality of fasteners, and attaching nuts as separate pieces. In one such arrangement, the U-bolt passes through a channel located at the top of the bucket and through two holes in the bracket, and clamps the assembly together with a plurality of nuts. The fasteners in one embodiment are molded or rigidly connected to the bracket. In another embodiment, fasteners are provided as separate pieces, e.g., pressure clamps or clips. The fasteners attach or connect the bracket (with the bucket attached thereon) to a base such as a railing, a gutter, a ladder, or another bracket.

In some embodiments, the container system comprises a plurality of brackets with each adapted with different types of fasteners, allowing the brackets to be used interchangeably for different applications. For example in one application, the nuts are unscrewed to remove the U-bolt and bucket from a first bracket, e.g., a bracket with clamp attachments, and swapping out the first bracket with a second bracket with curve attachment bar(s), thus allowing the container system to be used with different types of bases, e.g., different types of ladders or support bases.

In some embodiments, instead of unscrewing and screwing attachment nuts to unclamp/reclamp the U-bolt to swap in/swap out the brackets, multiple brackets are used. In this example, the bucket is attached onto a first bracket, e.g., with U-bolt and attaching nuts or integrated molded into the bracket as a single piece. The first bracket is provided with fasteners such as clamps, clips, slots, etc., that correspondingly couple with or can be used to attach the first bracket to a second bracket with mating fasteners. Thus, the second bracket can be easily swapped in and out by decoupling from the first bracket, allowing the container (as attached to the first bracket) to be easily moved from one job to another, e.g., quickly uncoupled from a (second) bracket adapted to use with a certain type of a ladder and coupled with another (second) bracket adapted with an attachment bar for use with yet another type of a ladder, or to a roof gutter.

In some embodiments, the bucket for container system is sized such that a commercially available utility bucket, e.g., a bucket containing materials such as paint, coating, joint compounds, etc., can be easily swapped in and out with another utility bucket when it is emptied. When a bucket of a similar size is stacked up or put into another bucket, there may be suction that makes it difficult to separate apart. Thus, in some embodiments, the bucket of the container system is provided with plurality of holes at the bottom and/or along the sidewall to reduce the suction, allowing an inner bucket to be dislodged.

Reference will be made to the figures, showing various embodiments of the container, supports, and methods for using thereof In FIG. 1, a container system 10 is shown. The container 11 is a standard 5 gallon bucket from a hardware or home improvement store, or a standard container for containing materials such as paint, joint compound, etc. The U-bolt 13 is used to fasten/secure the container 11 to the bracket 12. The bracket 12 is provided with a graduated line at the top (not shown) for measurements. The U-bolt 13 can be secured by being positioned in channel 16 provided with the bucket, or as shown, secured around the top of the container 11 by clips 15. U-bolt is fastened to bracket 12 at hole 17 with a plurality of nuts. Clamps 14 are provided to attach the bracket 12 (and container 11) to a base, e.g., a gutter as shown.

Figure 2:
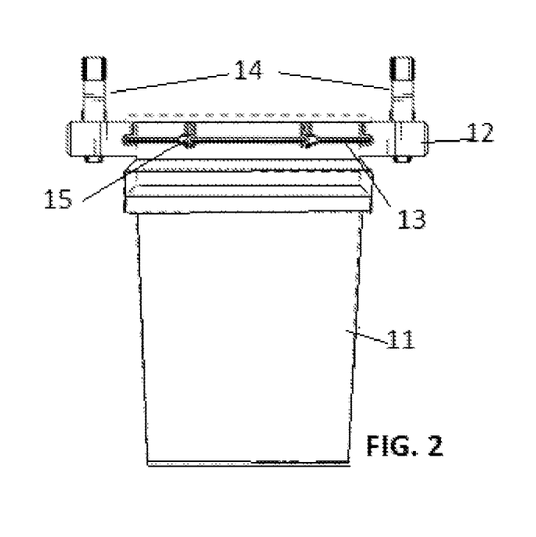
FIG. 2 is a front view of the container system of FIG. 1.

The front view of the container system is shown in FIG. 2, with a plurality of clips 15 provided to secure / fasten the U-bolt 13 around the container 11 to the bracket 12.

Figure 3:
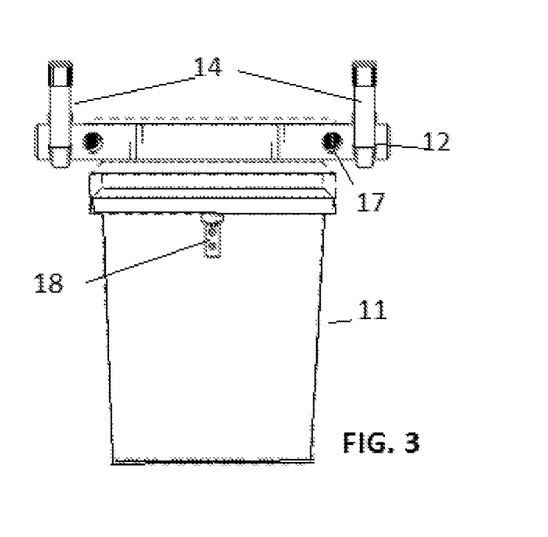
FIG. 3 is a back view of the container system of FIG. 1.

FIG. 3 shows the back view of the container system 10. Holes 17 are provided to secure the U bolt ends to the bracket 12 with a plurality of nuts (not shown). In one embodiment, an L bracket 18 is provided to provide stability for the container system, e.g., keeping the container 11 level.

Figure 4:
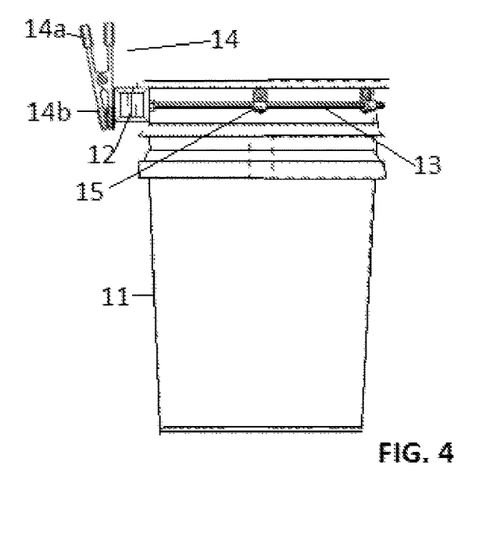
FIG. 4 is a side view of the container system of FIG. 1.

FIG. 4 is a side view of the container attachment system 10, showing the mounting clamp 14 with an X configuration with grip portions 14a and clamp portions 14b to secure the bracket 12 to a base such as a railing (not shown), or to secure the bracket 12 to a second bracket (not shown).

Figure 5:
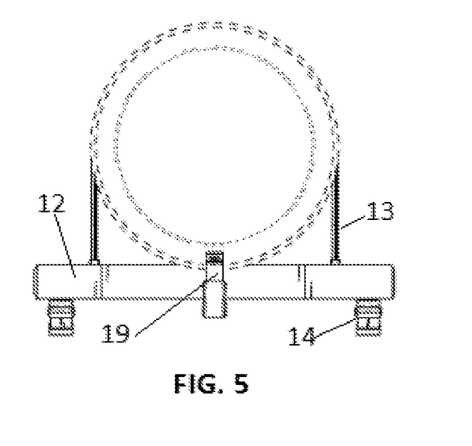
FIG. 5 is a top view of the container system of FIG. 1.

FIG. 5 is a top view of the container attachment system 10, showing an optional clip 19 to attach the container 11 to the bracket 12.

Figure 1:
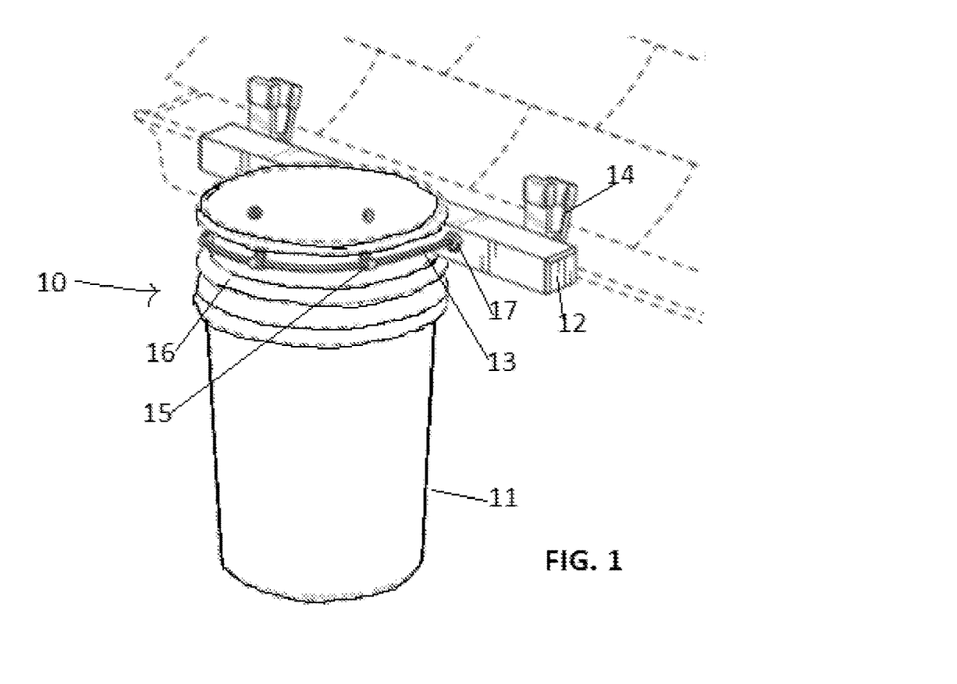
FIG. 1 is a perspective view of a container system according to one embodiment of the disclosure.
Figures 6, 7:
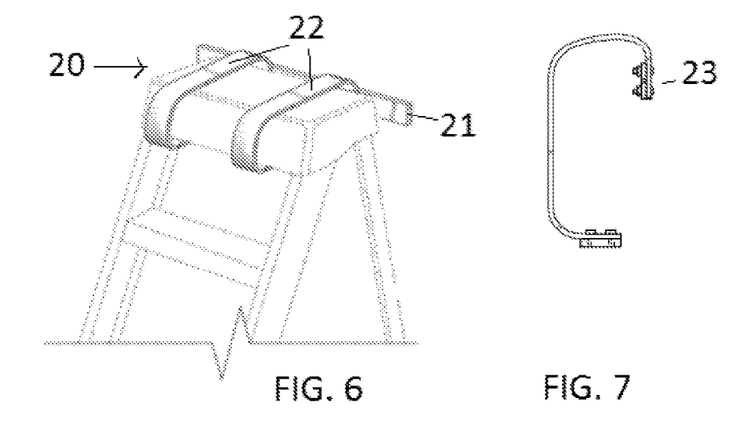
FIG. 6 is a perspective view of a bracket that can be used with the container system of FIG. 1, for use with a ladder top.
FIG. 7 is a side view of the bracket of FIG. 6.

FIG. 6 is a perspective view of a bracket 20 that can be used with the container system of FIG. 1, for use with a ladder top. The bracket has a blade 21, optionally provided with holes (not shown) for open ends of a U-bolt to attach to a container. In some embodiments, the blade 21 is provided with a plurality of clips or clamps (not shown), for attaching or clamping the blade 21 bracket to a second bracket. The bracket 20 has a plurality of braces 22 for securing or attaching to the top of a base such as a ladder top as shown.

Figure 8:
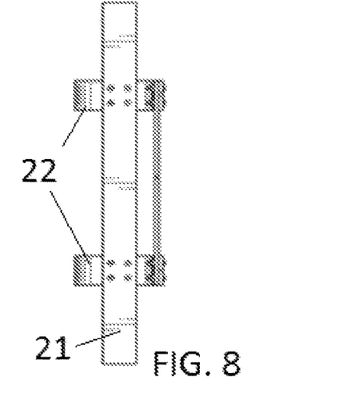
FIG. 8 is a top view of the bracket of FIG. 6.

FIG. 7 is a side view of the bracket 20, showing a plurality of screws/nuts for attaching the blade 21 to the braces 22. The braces and blade do not have to be connected with the use of fasteners as shown. They can be welded, riveted, casted, or molded together. FIG. 8 is a top view of the bracket 20 showing the plurality of fasteners for use in securing the braces 22 to the blade 21.

Figure 9:
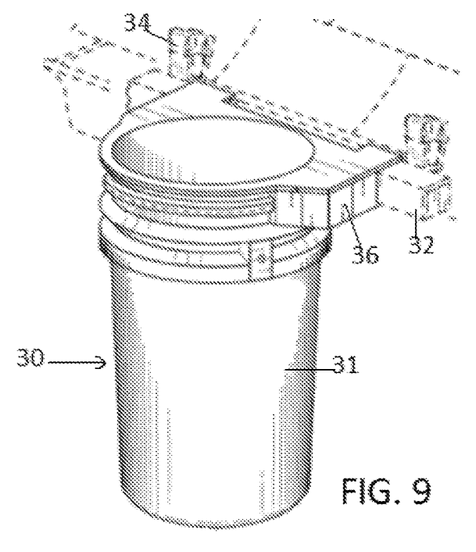
FIG. 9 is a perspective view of a container system according to another embodiment of the disclosure.

FIG. 9 is a perspective view of a container system 30 according to another embodiment with the bracket being integrated with the container 31 as one single molded piece, and no U-bolt. The system is provided with an expanded (flare) top 36 forming a partial collar covering at least 40% of the circumference or top edge of the container, with the flare top having a thickness of at least ½" thick to provide integrity and support to the container system. The flare top has a length that is at least as long the radius of the container for a round bucket, or at least as long as the shortest dimension of the container for a square or rectangular bucket.

In one embodiment, a bracket section 32 (shown in dotted line) is used to provide support to the integrated container system. The bracket section 32 is provided with a plurality of fasteners, e.g., clamps 34, for clamping the container system to a base such as a roof gutter, a railing, etc. In another embodiment (not shown), fasteners such as protrusions, hooks, fastening tongues, etc., can be molded into the bracket or container system as a single piece.

Figure 10:
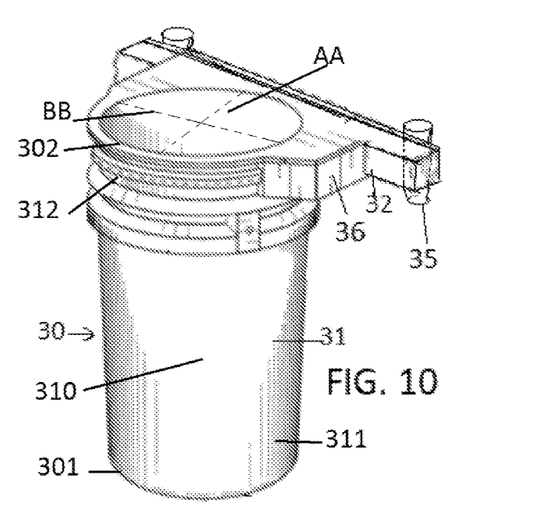
FIG. 10 is a perspective view of a container system according to yet another embodiment.

FIG. 10 is a perspective view of a container system 30 according to yet another embodiment of the disclosure with the bracket being integrated with the container 31 as one single molded piece, and with no U-bolt. The container 31 has a bottom surface 301 and a sidewall 310 having a sidewall top 312 and a sidewall bottom 311. The bottom surface 301 is connected to the bottom of the sidewall 311 defining a cavity. The bucket top 302 is circular, with a first dimension BB and a second dimension AA. Flare top or collar 36 extends around and surrounding at least a portion of the sidewall top 312. The bracket section 32 is provided with two integrated protrusions 35, sized to fittingly slide into corresponding open slots (holes) of a base such as a ladder top or a holding rack (not shown). When in use with a ladder top as a base, the bottom of the container may rest on or lean against the back side of the ladder, or the horizontal bar connecting the two back-side legs of the ladder.

Figure 11:
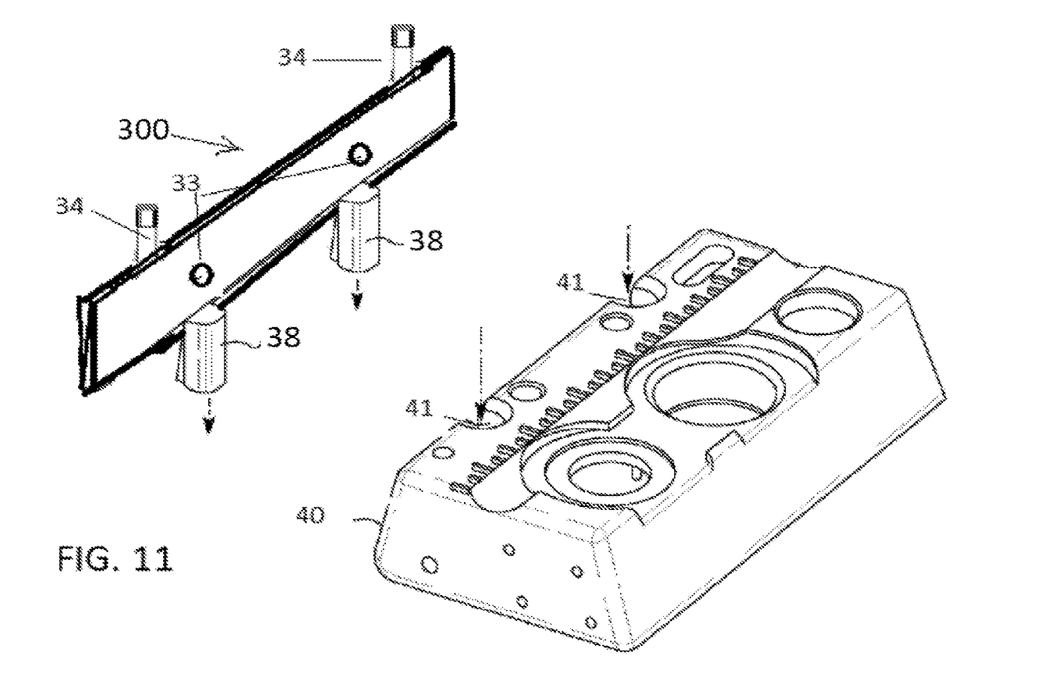
FIG. 11 is a perspective view of a bracket that can be used with a container system, for use with a ladder top.

FIG. 11 is a perspective view of a bracket 300 that can be used with a container system, for use with a ladder top 40. Protrusions 38 slide into the corresponding open slots 41 of ladder top 40 to hold the bracket 300 in place. A plurality of clamps 34 attach the bracket 30 to a container (not shown). In one embodiment, the bracket 300 can be used with a container directly without the need for another bracket. The bracket is optionally provided with holes 33 to secure the open ends of a U-bolt, so that the container can be fastened or attached to the bracket 300, and then onto the ladder, with the bottom of the container resting or leaning against the back side, or the horizontal bar connecting the two back-side legs of the ladder.

Figure 12:
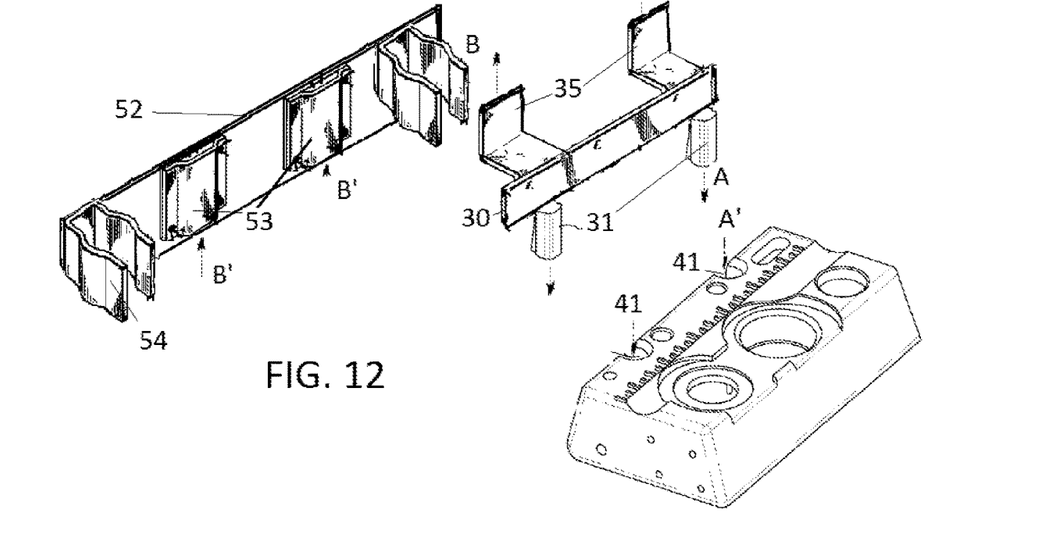
FIG. 12 is a perspective view of a container system with a first bracket attached to a bucket (bucket not shown), and a second bracket for attaching the container (via the first bracket) to a ladder top.

FIG. 12 is a perspective view of a container system with a first bracket 52 attached to a container (not shown), and a second bracket 30 for attaching the container (via the first bracket) to a ladder top. As illustrated, the second bracket 30 has protrusions 31 that slide into open slots 41 of the ladder top (going from A into A'). Once the second bracket 30 is steady in place at a top of the ladder, the first bracket 52 (with a container attached) can be hooked onto the second bracket 30. The second bracket has a plurality of tongues 35 that can be used to hook onto the first bracket 52 via slot members (or hooks) 53, going from B' onto B. Tongues 35 can be L-shape as shown, or they can be straight blades. The slot members 53 in the first bracket can be protruded slots as shown, or can be open slits or slots in the first bracket. The first bracket 52 is optionally provided with spring pressure clips 54 that can be used to hold or attach tools such as paint brushes, extension poles, to the container system.

Figure 13:
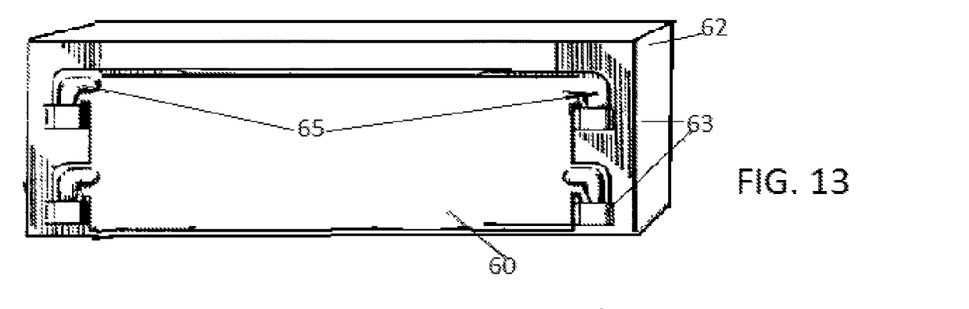
FIG. 13 is a front view showing the connection of a bracket to a base (or a second bracket) with the use of L-shaped hooks.

FIG. 13 is a side view showing a second embodiment for connecting a bracket to a base or a second bracket with the use of L-shaped hooks with optional tapered notches. Bracket 60 has a plurality of L-shaped hooks 65 at the two ends, which extend into slots 63 of a second bracket (or a base) 62, to tightly hold the bracket 60 in place. After insertion, the supporting hooks are pressed downwardly until the tapered notches ride down the slots. The bracket 60 is shown with two L-shaped hooks at each end, although one is sufficient to keep the bracket in place. Either the first bracket 60 or the second bracket 62 can be used as the bracket for holding a bucket in place, and with the other bracket being provided with fasteners, protrusions, or hooks for connection with a base, e.g., a ladder, a gutter, a railing, etc.

Figure 14:
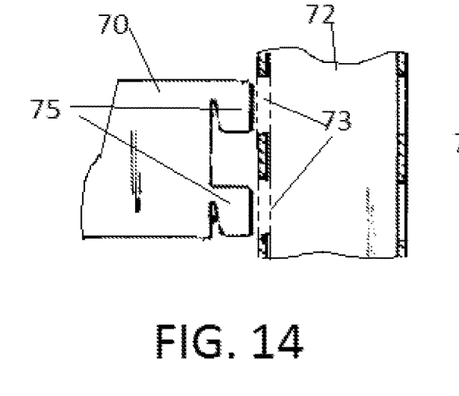
FIG. 14 is a side view showing a second embodiment for connecting a bracket to a base or a second bracket with the use of L-shaped hooks.

FIG. 14 is a side view showing yet another embodiment for connecting a bracket to a base, or a second bracket, using another type of hooks which securely connects a first bracket 70 to a second bracket (or a base) 72. As illustrated, after insertion into slot 73, each hook 75 is pressed downwardly until the tapered notch rides down over the lower edge of the respective slot 73, holding the first bracket 70 securely connected to the second bracket 72.

Figure 15:
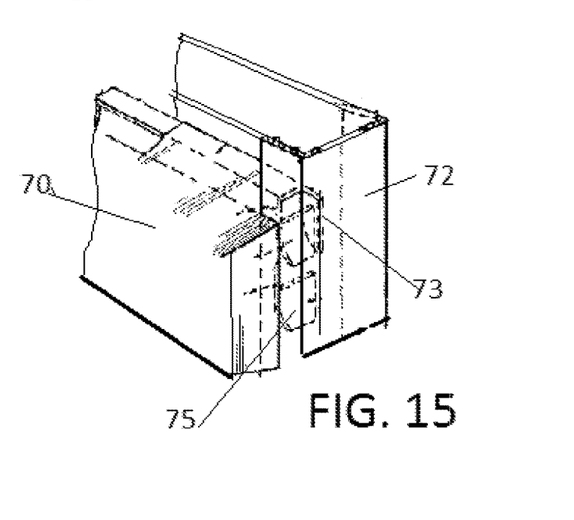
FIG. 15 is a perspective view showing the connection with L-shaped hooks in FIG. 14.

FIG. 15 is a perspective view showing the connection with hooks in FIG. 14. Although not shown, the second bracket 72 may be provided with a plurality of slots spaced apart to accommodating (first) brackets of different sizes, e.g., brackets for 5 gal. utility buckets, brackets for a square bucket, brackets for 2 gal. utility buckets, etc.

Figure 16A:
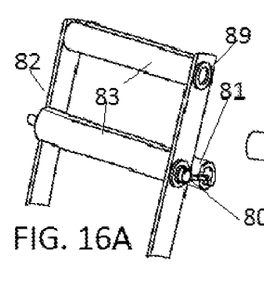
FIG. 16A is a perspective view showing the use of a removable locking device to secure a bracket (for attaching a container) to an extension ladder via the side cavities of a ladder rung.
Figure 16B:
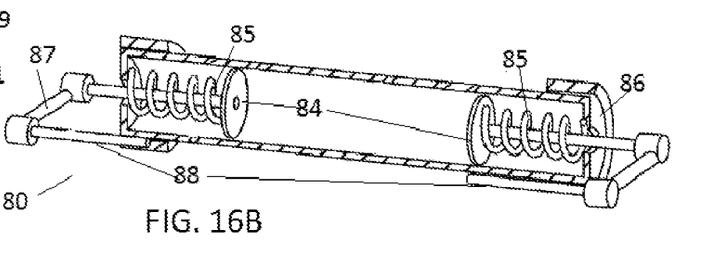
FIG. 16B is a perspective view showing the internals of the locking device of FIG. 16A.

FIG. 16A is a perspective view showing a fastener in the form of a removable locking device 80 to secure a bracket 81 (for attaching a container) to an extension ladder 82 via a side cavity 89 of a ladder rung 83. There are separate locking devices for both the left and right side (cavities) of the extension ladder. FIG. 16B is a perspective view showing the internals of the locking device 80. The removable locking device 80 features a spring mechanism with a flange 84 for compressing a spring 85 between the flange and an end cap 86. The flange is further connected to a shaft 87 that connects to an insertion pin 88 connected to the bracket (not shown) for attaching a container, e.g., a bucket (not shown). The flange and end cap are sized for insertion into the side cavity 89 of a ladder rung. In one embodiment (not shown), instead of an insertion pin, a set of (second) spring mechanisms can be used for insertion into a bracket of different sizes.

Figure 17:
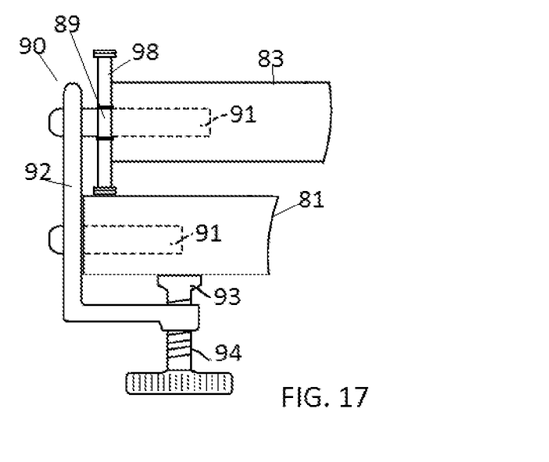
FIG. 17 is a perspective view of another embodiment of a fastener, incorporating a locking bolt and jaw mechanism to securely clamp a bracket to a ladder rung via a side cavity.

FIG. 17 is a perspective view of another embodiment of a removable locking device 90, incorporating a locking bolt and jaw mechanism to securely clamp a bracket to a ladder rung 83 via a side cavity 89. Insertion pins 91 are fixed to a handle bar 92. A screw clamp 93 is used to frictionally engage its jaw 94 with the bracket 81, pressing it against a side rail 98 of the ladder 82. The insertion pins can be sized for fittingly inserted into the side cavity 89 of the extension ladder, or a side cavity of the bracket. In one embodiment (not shown), additional braces (similar to braces shown in FIGS. 6-8) can be provided to secure the bracket to the ladder rung.

Figure 18:
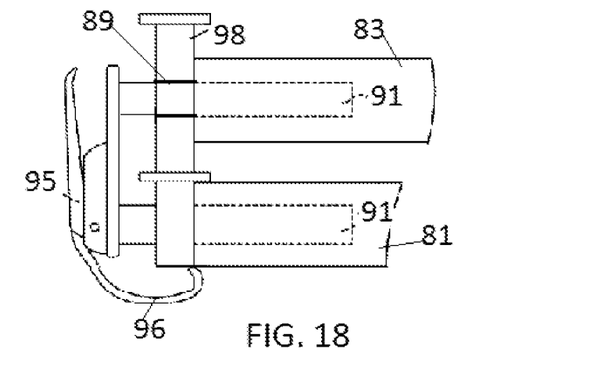
FIG. 18 is a perspective view of yet another embodiment of a fastener, incorporating a latch for securely clamping a bracket to a ladder rung.

FIG. 18 is a perspective view of yet another embodiment of a fastener, in the form of a latch for securely clamping the bracket 81 to a ladder rung 83. The jaw 96 of the screw clamp 95 frictionally engages bracket 81 to the rung 83, while the insertion pins 91 are inserted into the cavity 89 of the ladder rung 83, allowing the bracket 81 to be securely braced against the extension ladder via the side rail 98.

It should be noted that the fasteners in the form of locking devices can be used to secure a bracket to a ladder rung of an extension ladder, or can be used directly in securing a container with an integrated built-in collar to a ladder rung (e.g., the container systems shown in FIG. 9 or FIG. 19), with one of the insertion pins being sized to fit into a hole or a cavity in the molded collar piece.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms have the same meaning as commonly understood by one of ordinary skill in the art to which this invention belongs. The singular forms "a," "an," and "the," include plural references unless expressly and unequivocally limited to one referent.

The invention claimed is:

1. A container system, comprising:
    a bucket having a bottom surface and a sidewall having a sidewall top portion and a sidewall bottom portion, the bottom surface is connected to the sidewall defining a cavity, the bucket having a circular, square or rectangular top, wherein the top of the bucket has a first dimension and a second dimension;
    a collar extending perpendicularly around and surrounding at least a portion of the sidewall top portion, the collar having at least two open holes on outermost ends of the collar, the at least two open holes defining a tubular passage;
    a straight member within the at least two open holes of the collar, the straight member forming a bracket section, and the straight member having a length at least equal to the first dimension; wherein the straight member is adapted with a plurality of first fasteners to attach the container system to a base or a bracket;
    wherein the collar is integral with the sidewall and spaced outwardly therefrom, said collar having a top planar surface substantially parallel to the bucket bottom surface, said collar including two outermost sides that respectively have a parallel portion and a flared portion, each of said parallel portions are parallel to each other and includes a respective one of said at least two open holes, and each of said flared portions respectively extends from the sidewall outward to said respective parallel portion,
    each said flared portion having a thickness in a third dimension of at least ½";
    a distance between the flared portions defining a length at least equal to the first dimension; and wherein the straight member is configured to allow attachment of the bucket to an additional structure.

2. The container system of claim 1, wherein the plurality of first fasteners is selected from braces, clamps, locking devices, clips, hooks, protrusions, and combinations thereof.

3. The container system of claim 1, wherein the base is a roof gutter, and the plurality of first fasteners are clamps for clamping the container system to the roof gutter.

4. The container system of claim 1, wherein the base is a ladder top with a plurality of open slots, and the plurality of first fasteners includes protrusions that are sized to correspondingly fit into the open slots to attach the container system to the ladder top when the protrusions are disposed into the open slots.

5. The container system of claim 1, wherein the base is a ladder rung of an extension ladder, the ladder rung having two cavities each along a left side rail and a right side rail of the extension ladder, and the plurality of first fasteners includes two locking devices for simultaneously grasping both the left and the right cavities to secure the straight member and the bucket attached thereto to the extension ladder.

6. The container system of claim 1, wherein the container system further comprises a second bracket to attach the container system to the base, and
    wherein the plurality of first fasteners attach the container system to the second bracket, and wherein the second bracket is adapted with a plurality of second fasteners to attach the container system to the base.

7. The container system of claim 1, wherein the bucket is a round bucket with the top of the bucket having an inner radius R as the first dimension and the second dimension is equal to R.

8. The container system of claim 1, wherein the first fasteners comprise slidably adjustable braces for hooking over the base.

9. The container system of claim 1, wherein the base is a railing with a plurality of open slits and the plurality of first fasteners includes a plurality of projecting tongues with a plurality of open slits and the first bracket is adapted with a plurality of projecting tongues that are sized to correspondingly wedge into the open slits when the projecting tongues are inserted into the open slits to attach the container system to the railing.

10. The container system of claim 1, wherein the collar and the straight member are integratedly molded into the bucket as a single piece.

11. A combination of a ladder and the container system of claim 1, wherein the container system is connected to the ladder, the ladder including a top surface with at least two open holes, and the plurality of first fasteners are protrusions sized to fit into the at least two open holes to removably secure the container system to the ladder.

12. The combination of the ladder and the container system of claim 11, wherein the collar and the straight member are integratedly molded into the bucket as a single piece.

* * * * *